(12) United States Patent
Ogawa et al.

(10) Patent No.: US 12,172,336 B2
(45) Date of Patent: Dec. 24, 2024

(54) TRANSPORT SYSTEM

(71) Applicant: MURATA MACHINERY, LTD., Kyoto (JP)

(72) Inventors: Takahiro Ogawa, Inuyama (JP); Yasuhiro Kato, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 76 days.

(21) Appl. No.: 18/039,737

(22) PCT Filed: Oct. 15, 2021

(86) PCT No.: PCT/JP2021/038266
§ 371 (c)(1),
(2) Date: Jun. 1, 2023

(87) PCT Pub. No.: WO2022/118544
PCT Pub. Date: Jun. 9, 2022

(65) Prior Publication Data
US 2024/0017435 A1      Jan. 18, 2024

(30) Foreign Application Priority Data
Dec. 2, 2020   (JP) .................................. 2020-200419

(51) Int. Cl.
*B26D 7/18*         (2006.01)
*B23Q 7/04*         (2006.01)
(Continued)

(52) U.S. Cl.
CPC ............... *B26D 7/18* (2013.01); *B23Q 7/043* (2013.01); *B23Q 7/048* (2013.01); *B65G 47/907* (2013.01); *B65G 17/323* (2013.01)

(58) Field of Classification Search
CPC .......... B26D 7/17; B23Q 7/048; B23Q 7/043; B65G 47/907; B65G 17/323
(Continued)

(56) References Cited

U.S. PATENT DOCUMENTS 3,912,089 A * 10/1975 Lineberry ............ B65G 47/907
                                                       414/744.8
5,680,936 A * 10/1997 Beers .................. H05K 13/0061
                                                       198/346.2
(Continued)

FOREIGN PATENT DOCUMENTS

JP       2017109231 A  *  6/2017  ............. B23K 26/10

OTHER PUBLICATIONS

Official Communication issued in International Patent Application No. PCT/JP2021/038266, mailed on Dec. 28, 2021.

*Primary Examiner* — James R Bidwell
(74) *Attorney, Agent, or Firm* — Keating & Bennett, LLP

(57) ABSTRACT

In a transport system, a gripper includes long-side grippers aligned in a long-side direction of a workpiece which is cut, by machining/cutting, into a product and a skeleton including an outer frame with an overall rectangular shape and a crossbar inside the outer frame, so that both ends thereof are connected to two shorter sides facing each other, and extending in the long-side direction, the long-side grippers gripping longer sides of the outer frame of the skeleton, and short-side grippers aligned in a short-side direction with respect to the workpiece and that grip shorter sides of the outer frame. At least one of the short-side grippers moves in the short-side direction and grips the shorter sides of the outer frame. A lifter lifts or lowers the gripper gripping the outer frame and the product to separate the outer frame and the crossbar from the product.

4 Claims, 14 Drawing Sheets

(51) Int. Cl.
*B65G 17/32* (2006.01)
*B65G 47/90* (2006.01)

(58) Field of Classification Search
USPC .......................................... 198/468.2, 468.6
See application file for complete search history.

(56) References Cited

U.S. PATENT DOCUMENTS

| | | | |
|---|---|---|---|
| 11,192,167 B2* | 12/2021 | Deiss | B21D 28/00 |
| 2008/0131256 A1* | 6/2008 | Veit | B65G 47/907 |
| | | | 414/730 |
| 2018/0370058 A1 | 12/2018 | Fukada et al. | |
| 2021/0155420 A1* | 5/2021 | Wallisch | B65G 47/82 |
| 2024/0067448 A1* | 2/2024 | Kinugawa | H01L 21/68707 |

* cited by examiner

TRANSPORT SYSTEM

BACKGROUND OF THE INVENTION

1. Field of the Invention

The present invention relates to a transport system.

2. Description of the Related Art

Conventionally, techniques for cutting out a product from a workpiece such as a plate material are known. In such techniques, the skeleton is separated from the product after the workpiece has undergone cutting machining performed by various machining tools such as a laser machining tool that performs cutting machining. Japanese Patent No. 6648765 discloses a technique of removing the skeleton by gripping the long sides of the skeleton with grippers when separating the skeleton from a product.

SUMMARY OF THE INVENTION

With such a conventional technique, it is difficult in some cases to favorably separate the skeleton from a product. Specifically, in the conventional technique, the crossbars extending in the long-side direction of the skeleton gripped by the grippers may sag down and get caught on the product in some cases when removing the skeleton.

Preferred embodiments of the present invention provide transport systems each capable of favorably separating a skeleton from a product.

A transport system according to an aspect of a preferred embodiment of the present invention includes a gripper, a lifter, and a controller, wherein the gripper includes a plurality of long-side grippers aligned in a long-side direction of a workpiece which is cut, by machining/cutting, into a product and a skeleton including an outer frame with an overall rectangular or substantially rectangular shape and including a crossbar located inside the outer frame, so that both ends thereof are connected to two shorter sides facing each other, and extending in the long-side direction, the long-side grippers gripping longer sides of the outer frame of the skeleton, and a plurality of short-side grippers aligned in a short-side direction with respect to the workpiece to grip shorter sides of the outer frame, wherein at least one of the plurality of short-side grippers moves in the short-side direction according to the short-side direction dimension of the workpiece and grips the shorter sides of the outer frame, wherein a lifter is operable to lift or lower the gripper gripping the outer frame and the product, to separate the outer frame and the crossbar from the product, and the controller is configured or programmed to control operations of the gripper and the lifter.

According to a transport system of an aspect of the present invention, since the transport system includes a gripper to grip both shorter sides and longer sides of the outer frame of a skeleton, it is possible to prevent sagging of crossbars extending in the long-side direction of the skeleton, and favorably separate the skeleton from the product.

In the transport system of the above aspect, the plurality of long-side grippers may move in the short-side direction according to the short-side direction dimension of the workpiece and grip the longer sides of the outer frame, and the plurality of short-side grippers may move in the long-side direction according to the long-side direction dimension of the workpiece and grip the shorter sides of the outer frame. According to such an aspect, since the long-side grippers move in the short-side direction according to the dimensions of the workpiece to grip the longer sides, and the short-side grippers move in the short-side direction and the long-side direction according to the dimensions of the workpiece to grip the shorter sides, it is possible to favorably separate the skeleton from the product to suit workpieces of various dimensions. In the transport system of the above aspect, the controller may be configured or programmed to control operations of the gripper so as to, after having moved at least one of the plurality of short-side grippers in the short-side direction, move the plurality of long-side grippers in the short-side direction. According to such an aspect, since control is performed so that the grippers do not interfere with each other when moving the grippers according to the dimensions of the workpiece, it is possible to prevent system stoppage and reduce the time and effort required for inspection work associated with system stoppage. The transport system of the above aspect includes a processing pallet and a supporter to ascend or descend relative to the processing pallet, wherein the processing pallet may include a pallet frame, a plurality of supporting plates positioned at predetermined intervals in the long-side direction of the workpiece inside the pallet frame, extending in the short-side direction, and supporting the workpiece at upper ends thereof, and a plate supporter extending in the long-side direction inside the pallet frame to support the plurality of supporting plates, wherein the supporter may include a plurality of lifting plates positioned at the predetermined intervals in the long-side direction of the workpiece, extending in the short-side direction, to ascend or descend between the plurality of supporting plates, and a notch provided in each of the plurality of lifting plates and into which the plate supporter enters when the plurality of lifting plates ascend relative to the processing pallet, the supporter may ascend relative to the processing pallet to deliver the workpiece supported at the upper ends of the plurality of supporting plates to the plurality of lifting plates, and after the plurality of lifting plates have supported the workpiece, the plurality of long-side grippers may move between the plurality of lifting plates in the short-side direction to grip the longer sides of the outer frame, and the plurality of short-side grippers may each move in the long-side direction through the notch to grip the shorter sides of the outer frame. According to such an aspect, the notch of the lifting plate is provided according to the position of the plate supporter that supports the supporting plate, and as the supporter ascends relative to the processing pallet, the workpiece supported at the upper ends of the supporting plates is transferred to the lifting plates and is supported by the lifting plates. Then, the short-side grippers move in the long-side direction through the notch to grip the shorter sides. Therefore, it is possible, while avoiding contact between the lifting plates and the grippers, to realize favorable separation of the skeleton from the product without requiring significant changes to be made to the existing system that includes the plate supporter supporting the supporting plates.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
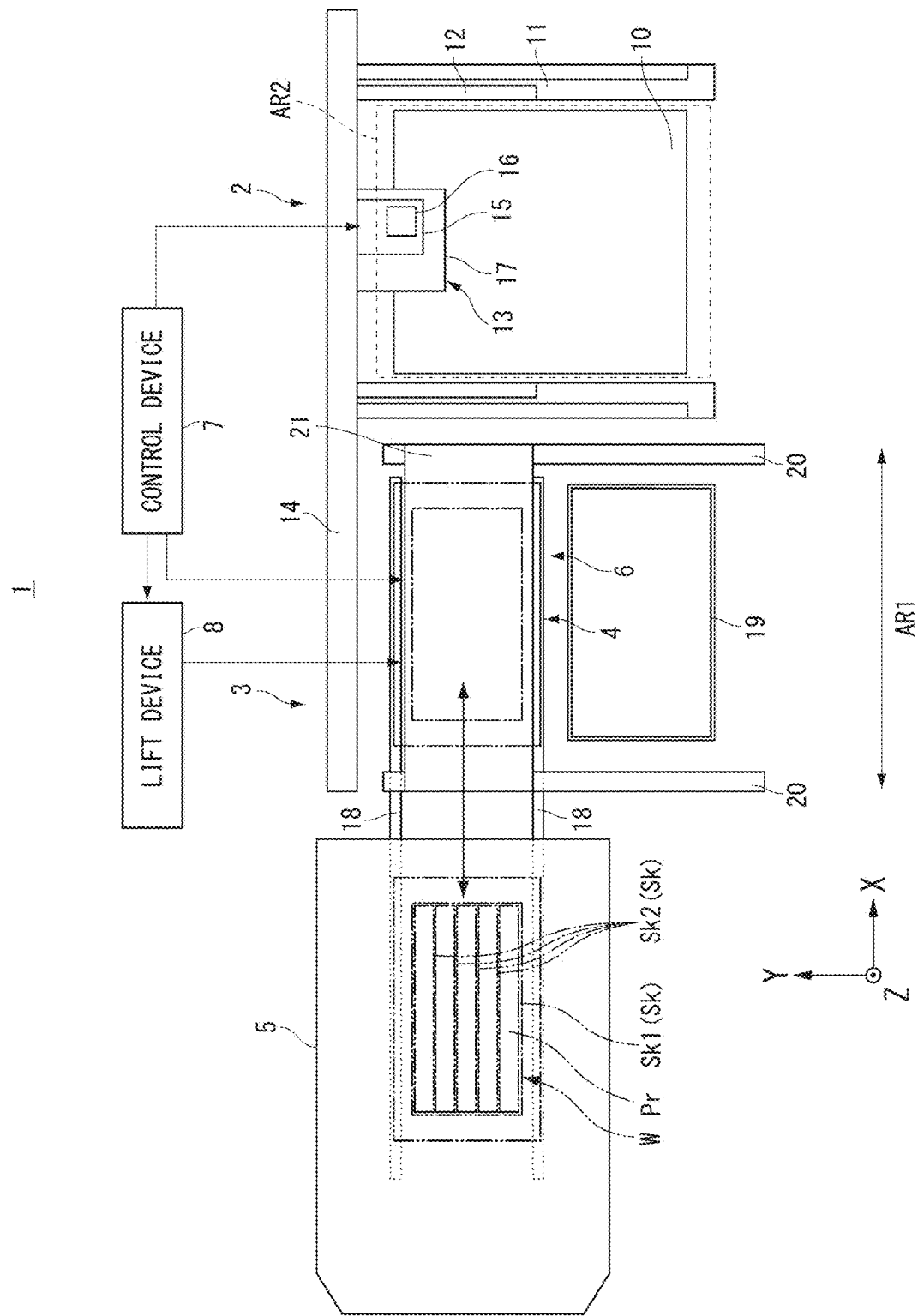
FIG. 1 is a diagram showing an example of a transport system according to a preferred embodiment of the present invention.

Hereunder, preferred embodiments will be described, with reference to the drawings. However, it should be noted that the present invention is not limited to the preferred embodiments described below. In the drawings, scale may be changed as necessary to illustrate the preferred embodiments, such as by enlarging, reducing or emphasizing a portion. In the drawings, an XYZ Cartesian coordinate system may be used to describe the directions in each drawing. In the XYZ Cartesian coordinate system, the vertical direction is taken as the Z direction, and the horizontal directions are taken as the X direction and the Y direction. In each direction, the direction of the arrow is referred to as +side (for example, +X side), and the side opposite to the direction of the arrow is referred to as -side (for example, -X side).

Figure 2:
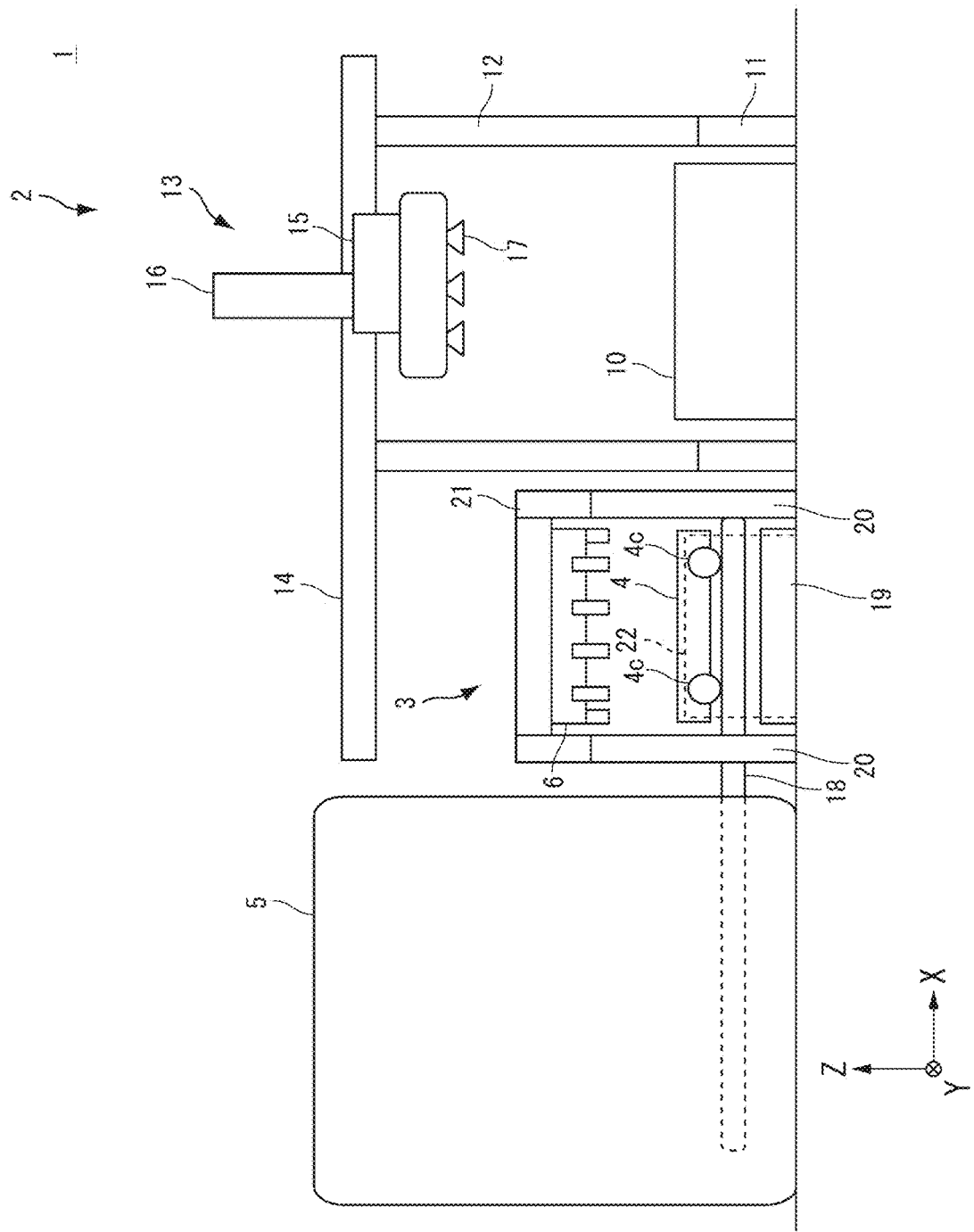
FIG. 2 is a diagram showing an example of a transport system according to a preferred embodiment of the present invention.

FIG. 1 and FIG. 2 are diagrams showing an example of a transport system according to a preferred embodiment of the present invention. Specifically, FIG. 1 is a top view of the transport system, and FIG. 2 is a side view of the transport system in the Y direction. A transport system 1 includes a loader device 2, a station device 3, a processing pallet 4, a laser machining tool 5, a gripper device 6, a control device 7, and a lift device 8.

In the transport system 1 there is provided a transport-in/out area AR1 and a temporary placement area AR2. The transport-in/out area AR1 is arranged adjacent to the +X side of the laser machining tool 5 between the laser machining tool 5 and the temporary placement area AR2. A workpiece W that has not undergone machining is transported from an arbitrary location to the transport-in/out area AR1. The workpiece W not having undergone machining is transported to the laser machining tool 5 from the transport-in/out area AR1. The laser machining tool 5 performs laser machining on the workpiece W that has been transported from the transport-in/out area AR1 and has not undergone machining.

The workpiece W that has undergone laser machining is transported from the laser machining tool 5 to the transport-in/out area AR1. A workpiece W having undergone laser machining includes a product Pr and a skeleton Sk. For example, the skeleton Sk includes an outer frame with an overall rectangular or substantially rectangular shape, and crossbars each extending in the long-side direction and connected to two short sides facing each other inside the outer frame. In FIG. 1, the outer frame of the skeleton Sk is represented as "outer frame Sk1", and the portions each extending in the long-side direction and connected to the two short sides facing each other inside the outer frame Sk1 are represented as "crossbars Sk2". In the following description, when the outer frame Sk1 and the crossbars Sk2 are not distinguished, they may simply be referred to as "skeleton Sk". The transport-in/out area AR1 also serves as an unloading area for unloading the product Pr out of the workpiece W having undergone laser machining. In the transport-in/out area AR1, the workpiece W having undergone laser machining is separated into the product Pr and the skeleton Sk. The product Pr is transported to the temporary placement area AR2, stacked on a product pallet 10, and transported out to the outside. FIG. 1 exemplifies a case where the skeleton Sk having crossbars Sk2 that are elongated in the X direction (the long-side direction of the workpiece W and the skeleton Sk) is included. FIG. 1 also exemplifies a case where four crossbars Sk2 are included.

The loader device 2 includes a rail 11, a traveling carrier 12 capable of traveling on the rail 11, and a transfer device 13 provided on the traveling carrier 12. The rail track 11 extends in a direction (Y direction) intersecting the moving direction (X direction) of the processing pallet 4. On the traveling carrier 12 there is provided a rail 14 extending in the X direction. The transfer device 13 is attached to the rail 14. The transfer device 13 includes an X moving body 15 that can move along the rail 14, a Z moving body 16 provided on the X moving body 15, and an adherer 17 provided at a lower end (on the -Z side) of the Z moving body 16. The rail 14 is provided over the temporary placement area AR2 and the transport-in/out area AR1. The X moving body 15 is movable between the temporary placement area AR2 and the transport-in/out area AR1. The Z moving body 16 is movable in the Z direction (up-down direction). As a result, the transfer device 13 can move in the X direction via the rail 14, in the Y direction via the rail 11, and in the Z direction by the Z moving body 16.

The adherer 17 adheres to and grips the product Pr out of the workpiece W having undergone machining, by a vacuum, pressure reduction, or the like. For example, after having adhered to and gripped the product Pr placed on the processing pallet 4 via adhesion of the adherer 17 and having moved the product Pr, the transfer device 13 releases the adherer 17 to thereby place the product Pr on the product pallet 10. On the lower surface side (-Z side) of the adherer 17 there are provided a plurality of adhesion pads. For example, the adhesion pads are provided with at least either multiple pads or single pads. It should be noted that the adherer 17 may be of a configuration to exert attraction via magnetism or the like.

In the station device 3 there are arranged the processing pallet 4 and the gripper device 6. The station device 3 includes rails 20 and a main body 21 movable along the rails 20. The planar shape of the processing pallet 4 as viewed in the Z direction is rectangular or substantially rectangular. In the processing pallet 4, the length thereof in the X direction is longer than the length thereof in the Y direction orthogonal to the X direction. As described above, the workpiece W not having undergone machining or the workpiece W having undergone machining is placed on the processing pallet 4. The processing pallet 4 can move into and out of the laser machining tool 5 while the workpiece W not having undergone machining or the workpiece W having undergone machining is still placed thereon. The processing pallet 4 transports the workpiece W between the transport-in/out area AR1 and the laser machining tool 5. The processing pallet 4 has wheels 4c movable along rails 18. The processing pallet 4 moves along the rails 18 by being towed. The mechanism that causes the processing pallet 4 to move can be changed as appropriate, and it may be a self-propelling mechanism, for example.

Figure 3:
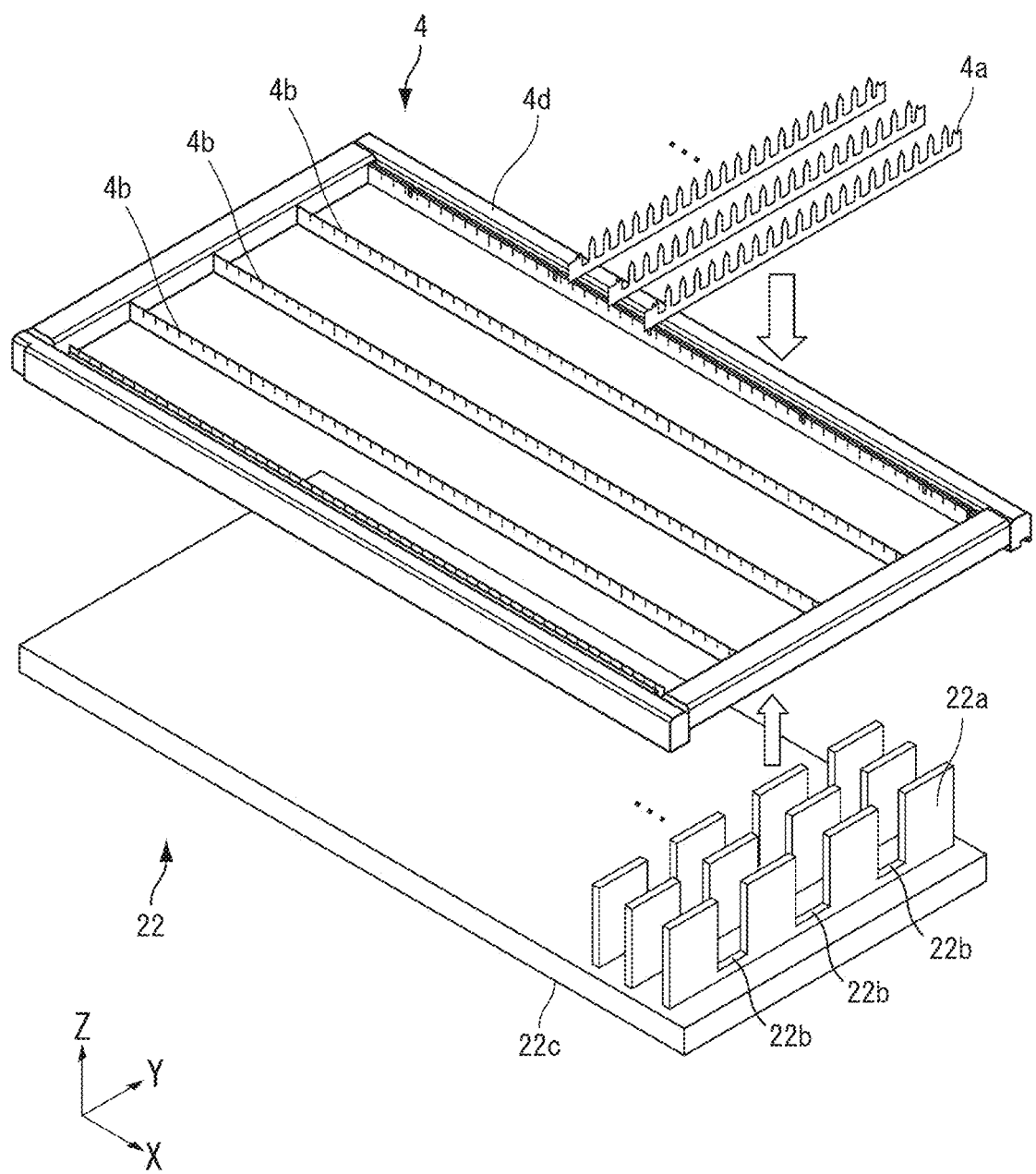
FIG. 3 is a diagram showing an example of a processing pallet and a supporter according to a preferred embodiment of the present invention.

The processing pallet 4 includes a pallet frame 4d, a plurality of supporting plates 4a, and plate supporters 4b (see FIG. 3). The plurality of supporting plates 4a each have a plate shape, are arranged at predetermined intervals in the long-side direction (X direction) of the workpiece W while being placed inside the pallet frame 4d, and extend in the short-side direction (Y direction) to support the workpiece W at the upper ends thereof. The plurality of supporting plates 4a each have an upper end with a saw-toothed shape. The plurality of supporting plates 4a support the lower surface of the workpiece W at a plurality of points (distal ends, that is, upper ends of the sawteeth). The plate supporters 4b each extend in the long-side direction of the workpiece W inside the pallet frame 4d and support the plurality of supporting plates 4a. Below the processing pallet 4 there is arranged a supporter 22 (fork unit or lift unit, see FIG. 3). The supporter 22 ascends or descends relative to the processing pallet 4. The supporter 22 includes a plurality of lifting plates 22a arranged at predetermined intervals in the long-side direction of the workpiece W, extending in the short-side direction, and ascending or descending between the plurality of supporting plates 4a. The supporter 22 also includes notches 22b provided in each of the plurality of lifting plates 22a and into which the plate supporters 4b enter when the plurality of lifting plates 22a ascend relative to the processing pallet 4. The supporting plates 4a and the supporter 22 will later be described in detail.

The gripper device 6 is arranged above the processing pallet 4 and removes the skeleton Sk from the workpiece W having undergone machining, which includes the product Pr and the skeleton Sk. The gripper device 6 is provided separately from the loader device 2, and removes the skeleton Sk from the workpiece W having undergone machining, before the product Pr is adhered by the transfer device 13. The gripper device 6 is movable in a direction (Y direction) perpendicular or substantially perpendicular to the direction (X direction) in which the laser machining tool 5 and the processing pallet 4 having retracted from the laser machining tool 5 are arranged. The gripper device 6 is supported by the main body 21 of the station device 3 and is movable in the Y direction together with the main body 21. The gripper device 6 includes a plurality of grippers (gripping parts), and grips the outer frame Sk1 with the plurality of grippers. The gripper device 6 then moves in the −Y direction while gripping the outer frame Sk1, and releases the grip above a residual material discharge location 19, and discharges the skeleton Sk.

The laser machining tool 5 irradiates the workpiece W not having undergone machining and placed on the processing pallet 4 with a laser beam to subject the workpiece W to laser machining (cutting machining). The laser machining tool 5 includes a laser head and a head driver. The laser head is connected to a laser light source via an optical transmission medium such as an optical fiber, and emits a laser beam downward. The laser light source is, for example, a solid-state laser light source such as fiber laser. As a result, it is possible to obtain a laser beam with a heat density higher than that of a carbon dioxide gas laser or the like. Therefore, the laser machining tool 5 using a fiber laser can perform cutting machining at high speed. In some cases, the workpiece W and the supporting plates 4a of the processing pallet 4 may become welded to each other as a result of laser machining. However, since the supporting plates 4a support the workpiece W at a plurality of points, it is possible to reduce the welded portions between the supporting plates 4a and the workpiece W.

The control device 7 is configured or programmed to control the transport system 1 in a comprehensive manner. For example, the control device 7 controls operations of the gripper device 6 and the lift device 8 to transport the skeleton Sk out to the residual material discharge location 19. The control device 7 also controls operations of the loader device 2 (transfer device 13) to thereby transport the product Pr placed on the processing pallet 4 to the product pallet 10. The control device 7 also controls ascending and descending of a movable plate 22c, which will be described later. The lift device 8 raises or lowers the gripper device 6 gripping the outer frame Sk1 and the product Pr relative to each other to thereby separate the skeleton Sk including the outer frame Sk1 and the crossbars Sk2 from the product Pr.

FIG. 3 to FIGS. 5A and 5B are diagrams showing an example of the processing pallet and the supporter according to the present preferred embodiment. The supporter 22 includes the plurality of lifting plates 22a arranged at predetermined intervals in the long-side direction of the workpiece W, extending in the short-side direction, and ascending or descending between the plurality of supporting plates 4a. The supporter 22 includes notches 22b provided in each of the plurality of lifting plates 22a and into which the plate supporters 4b enter when the plurality of lifting plates 22a ascend relative to the processing pallet 4. The supporter 22 also includes the movable plate 22c. The supporter 22 is arranged below the processing pallet 4 when the workpiece W having undergone machining is transported out of the laser machining tool 5 to the transport-in/out area AR1 (see FIGS. 4A and 4B). The movable plate 22c is movable in the vertical direction (Z direction). The plurality of lifting plates 22a are arranged on the upper surface of the movable plate 22c. FIG. 3 to FIGS. 5A and 5B exemplify a case where there are three notches 22b, however, the number of the notches 22b may also be two, four, or more.

The plurality of lifting plates 22a are each plate-shaped, for example, and extend vertically upward from the upper surface of the movable plate 22c. The plurality of lifting plates 22a may have a shape other than a plate shape, such as a columnar shape, for example. The plurality of lifting plates 22a are sized and arranged such that they can be inserted between the supporting plates 4a that are adjacent to each other on the processing pallet 4. The upper surfaces of the plurality of lifting plates 22a can face the workpiece W, and the positions (heights) of the upper surfaces of the plurality of lifting plates 22a are aligned. On each of the upper surfaces of the plurality of lifting plates 22a there may be provided an adherer 22d capable of adhering to the workpiece W having undergone machining. The adherers 22d adhere to the product Pr when the gripper device 6 grips the outer frame Sk1.

The processing pallet 4 includes supporting plates 4a that are arranged at predetermined intervals in the long-side direction (X direction) of the workpiece W and at a plurality of positions other than those of the plurality of lifting plates 22a, and that support the workpiece W above the supporter 22 before the workpiece W is supported by the supporter 22. The processing pallet 4 also includes the plate supporters 4b that are arranged according to the positions of the notches 22b while allowing the supporter 22 to support the workpiece W (arranged above the notches 22b), and that support the supporting plates 4a.

Figure 4A:
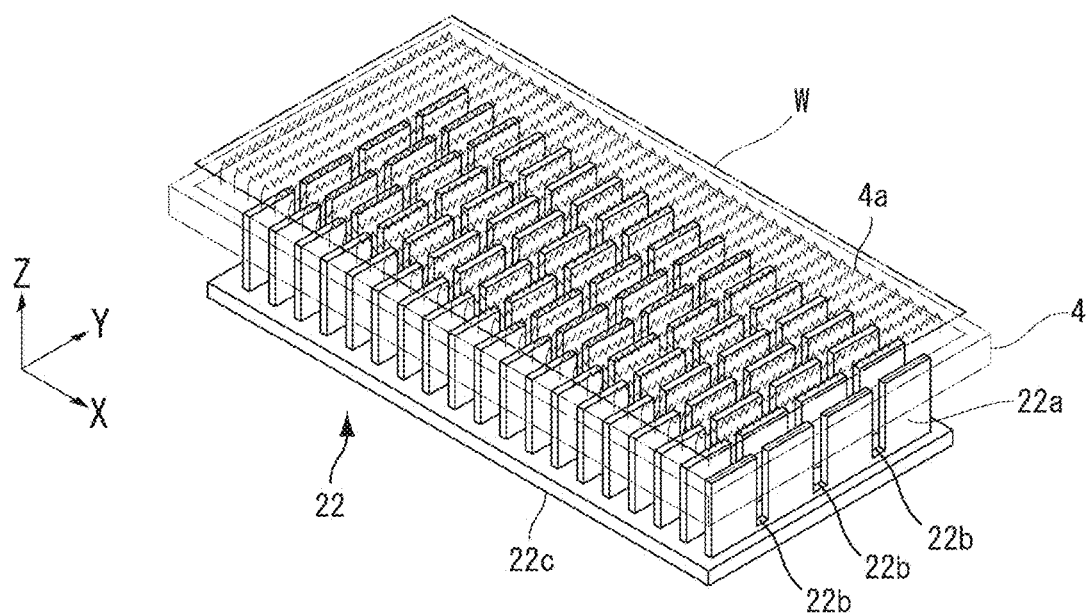
FIGS. 4A and 4B are diagrams showing examples of a processing pallet and a supporter according to a preferred embodiment of the present invention.
Figure 4B:
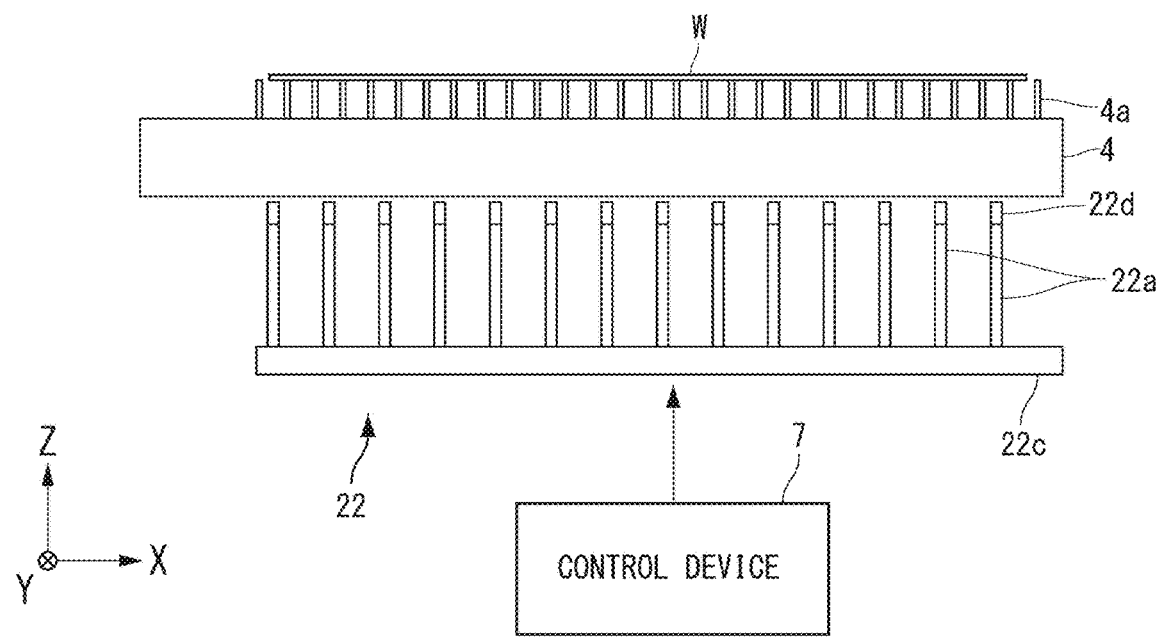
Figure 5A:
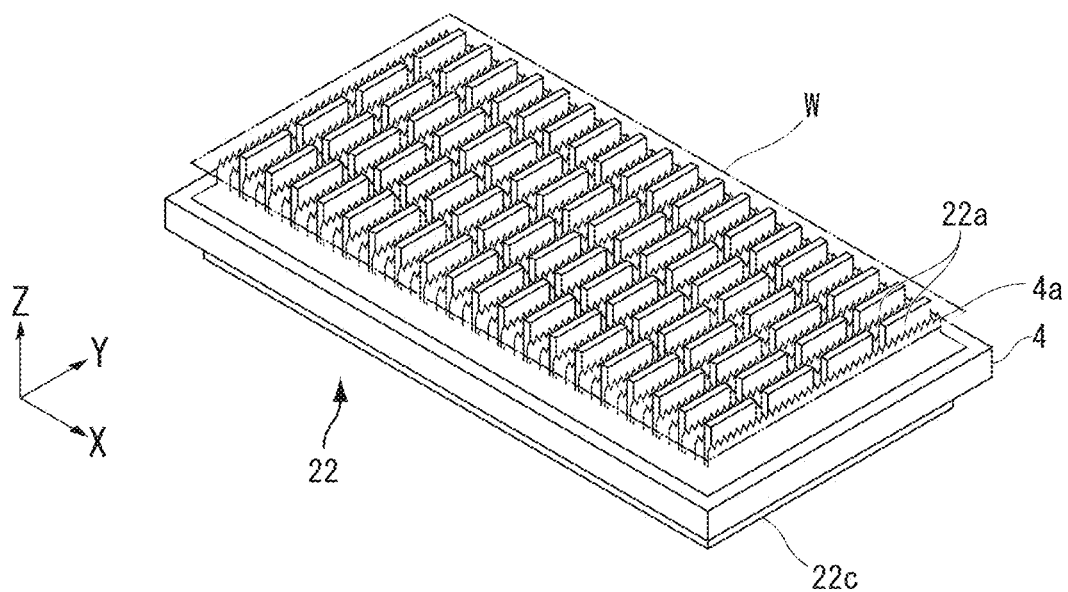
FIGS. 5A and 5B are diagrams showing examples of a processing pallet and a supporter according to a preferred embodiment of the present invention.
Figure 5B:
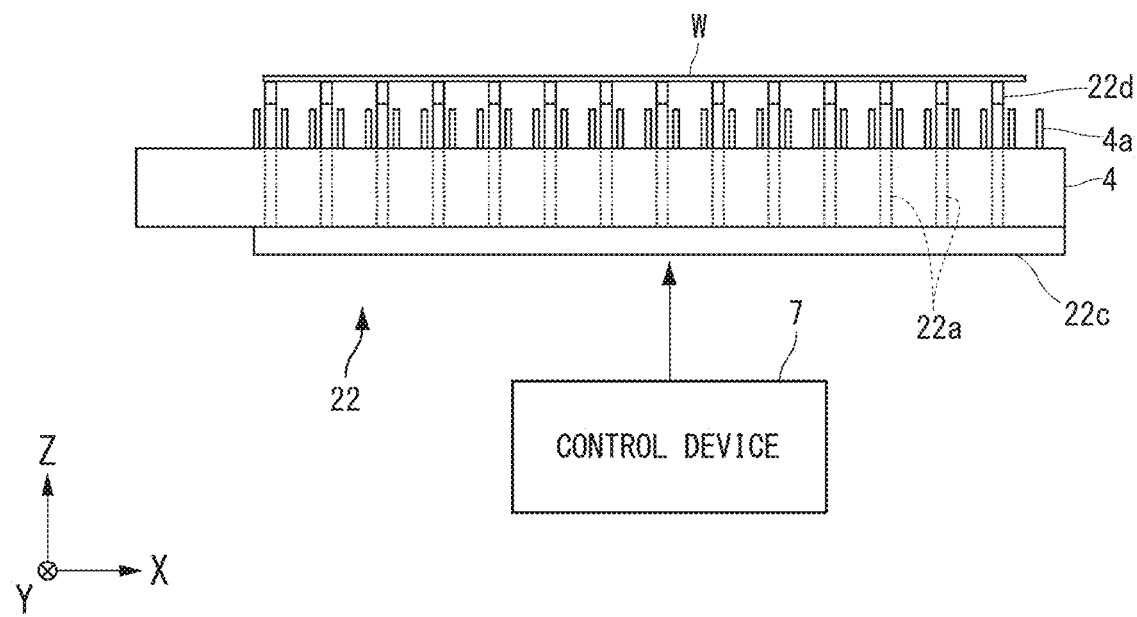

The movable plate 22c moves upward while the workpiece W is being held on the processing pallet 4 (supporting plates 4a) (see FIGS. 4A and 4B). The movable plate 22c moves until the upper ends of the plurality of lifting plates 22a have been above the upper ends of the supporting plates 4a (see FIGS. 5A and 5B). As a result, the supporter 22 (movable plate 22c) ascends relative to the processing pallet 4, whereby the workpiece W supported on the upper ends of the plurality of supporting plates 4a is transferred to the lifting plates 22a.

Figure 6:
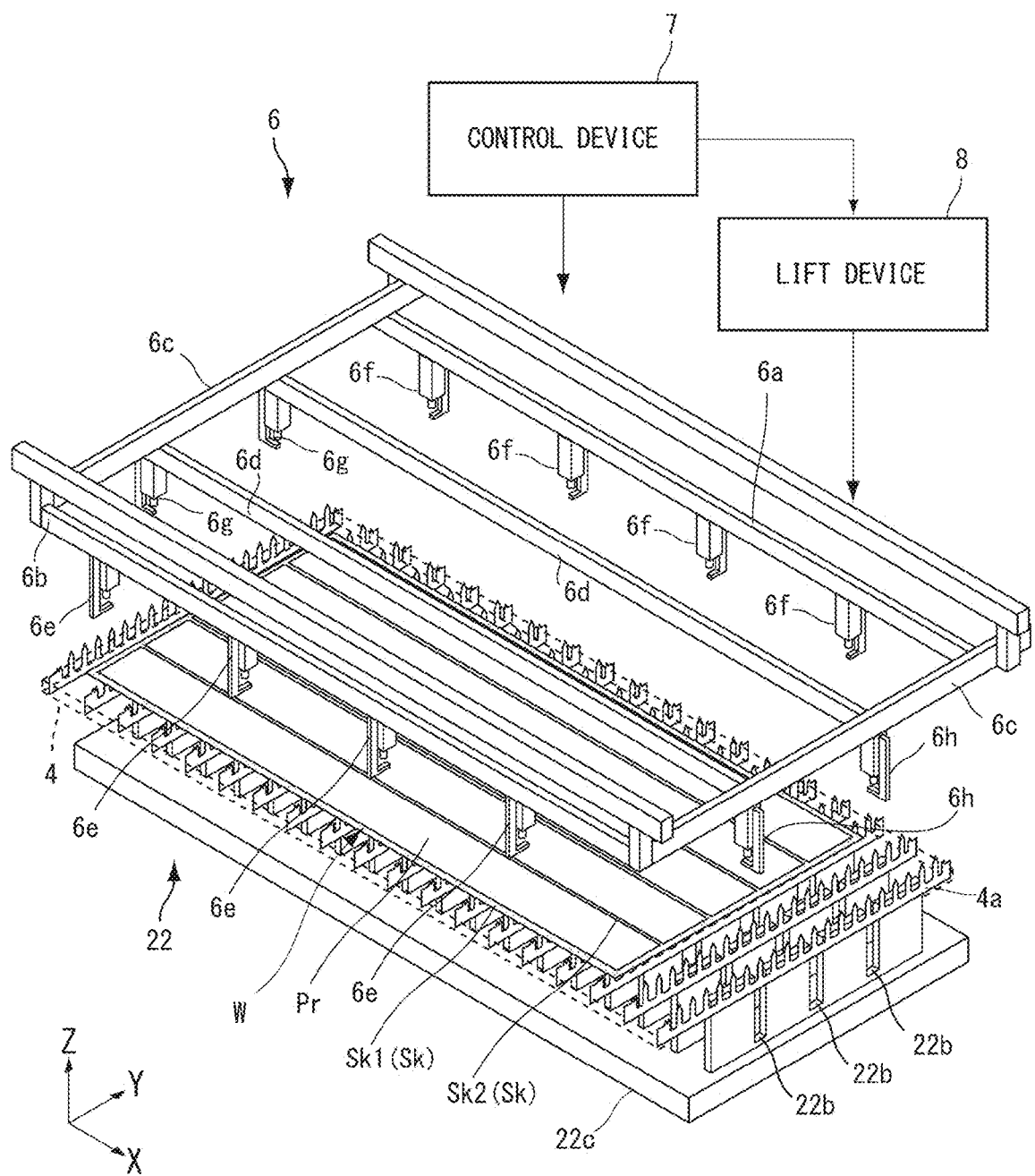
FIG. 6 is a diagram showing an example of a gripper device according to a preferred embodiment of the present invention.

FIG. 6 is a diagram showing an example of the gripper device according to the present preferred embodiment. The gripper device 6 includes a slider 6a, a slider facing member 6b, Y guides 6c, X guides 6d, long-side grippers 6e, long-side grippers 6f, short-side grippers 6g, and short-side grippers 6h. The plurality of long-side grippers 6e, 6f are arranged aligned in the long-side direction with respect to the workpiece W cut into the product Pr and the skeleton Sk, and grip the long sides of the outer frame Sk1 of the skeleton Sk. The plurality of short-side grippers 6g, 6h are arranged aligned in the short-side direction with respect to the workpiece W cut into the product Pr and the skeleton Sk, and grip the short sides of the outer frame Sk1 of the skeleton Sk.

The slider 6a is provided on the Y guides 6c so as to be slidable in the Y direction, and has the long-side grippers 6f therebelow. The slider facing member 6b is provided so as to face the slider 6a and includes the long-side grippers 6e therebelow. The Y guides 6c include the slider 6a and the X guides 6d, and are guides that allow the slider 6a and the X guides 6d arranged in the +Y direction to slide in the Y direction. The control device 7 controls the slider 6a and the X guides 6d arranged in the +Y direction to slide in the Y direction. The X guides 6d are provided on the Y guides 6c, and include the short-side grippers 6g and the short-side grippers 6h therebelow. The movement of the gripper device 6 enables the long-side grippers 6e on the −Y side to grip one of the long sides of the outer frame Sk1. The movement of the gripper device 6 and the sliding of the slider 6a enable the long-side grippers 6f on the +Y side to move in the short-side direction according to the short-side direction dimension of the workpiece W, and grip the other long side of the outer frame Sk1. The movement of the gripper device 6 and the movement via the X guides 6d enable the short-side grippers 6g on the −X side to move in the short-side direction according to the short-side direction dimension of the workpiece W, and grip one of the short sides of the outer frame Sk1. The movement of the gripper device 6 and the movement via the X guides 6d enable the short-side grippers 6h on the +X side to move in the short-side direction according to the short-side direction dimension of the workpiece W, move in the long-side direction according to the long-side direction dimension of the workpiece W, and grip the other short side of the outer frame Sk1. The short-side grippers 6g, 6h are initially positioned above the notches 22b. The control device 7 controls the short-side grippers 6h on the +X side to move in the X direction. The control device 7 also controls the gripping of the outer frame Sk1 performed by the long-side grippers 6e, the long-side grippers 6f, the short-side grippers 6g, and the short-side grippers 6h. Under control of the control device 7, the lift device 8 raises or lowers the gripper device 6 gripping the outer frame Sk1 and the product Pr relative to each other, to thereby separate the skeleton Sk including the outer frame Sk1 and the crossbars Sk2 from the product Pr.

The long-side grippers 6f are moved in the short-side direction by sliding with the slider 6a in the Y direction in accordance with the short-side direction dimension of the workpiece W, and grip the long sides of the outer frame Sk1. The movement of the X guides 6d in the Y direction causes the short-side grippers 6g, 6h on the +Y side to move in the short-side direction according to the short-side direction dimension of the workpiece W, and grip the short sides of the outer frame Sk1. Additionally, the short-side grippers 6h move in the long-side direction along the X guides 6d according to the long-side dimension of the workpiece W, and grip the short sides of the outer frame Sk1. After the supporter 22 has ascended relative to the processing pallet 4, causing the movable plate 22c to move until the upper ends of the plurality of lifting plates 22a are above the upper ends of the supporting plates 4a, and the workpiece W has been transferred from the supporting plates 4a to the plurality of lifting plates 22a, the gripping of the outer frame Sk1 performed by the gripper device 6 is executed.

Figure 7:
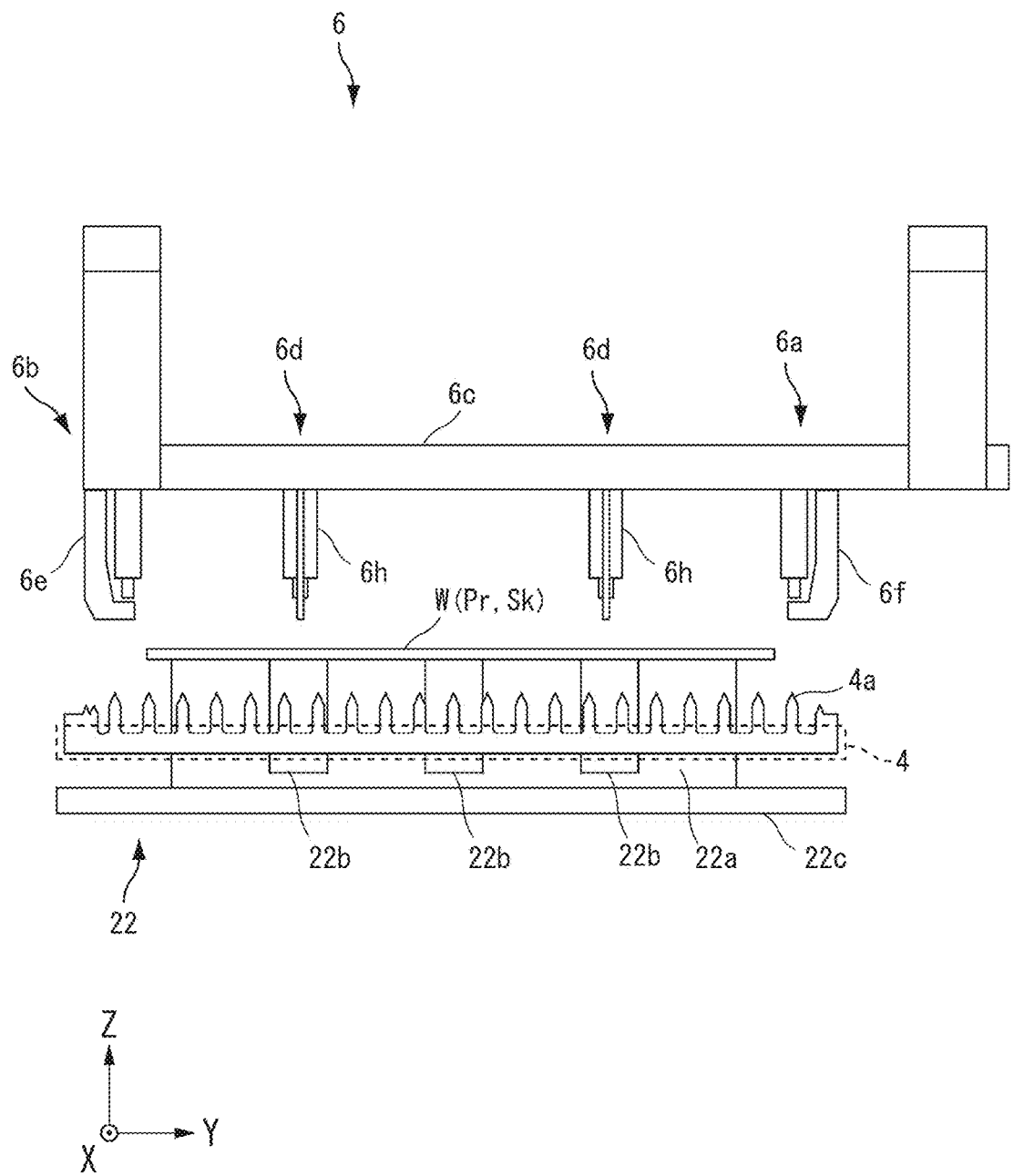
FIG. 7 is a diagram showing an example of gripping a skeleton by a gripper device according to a preferred embodiment of the present invention.
Figure 8:
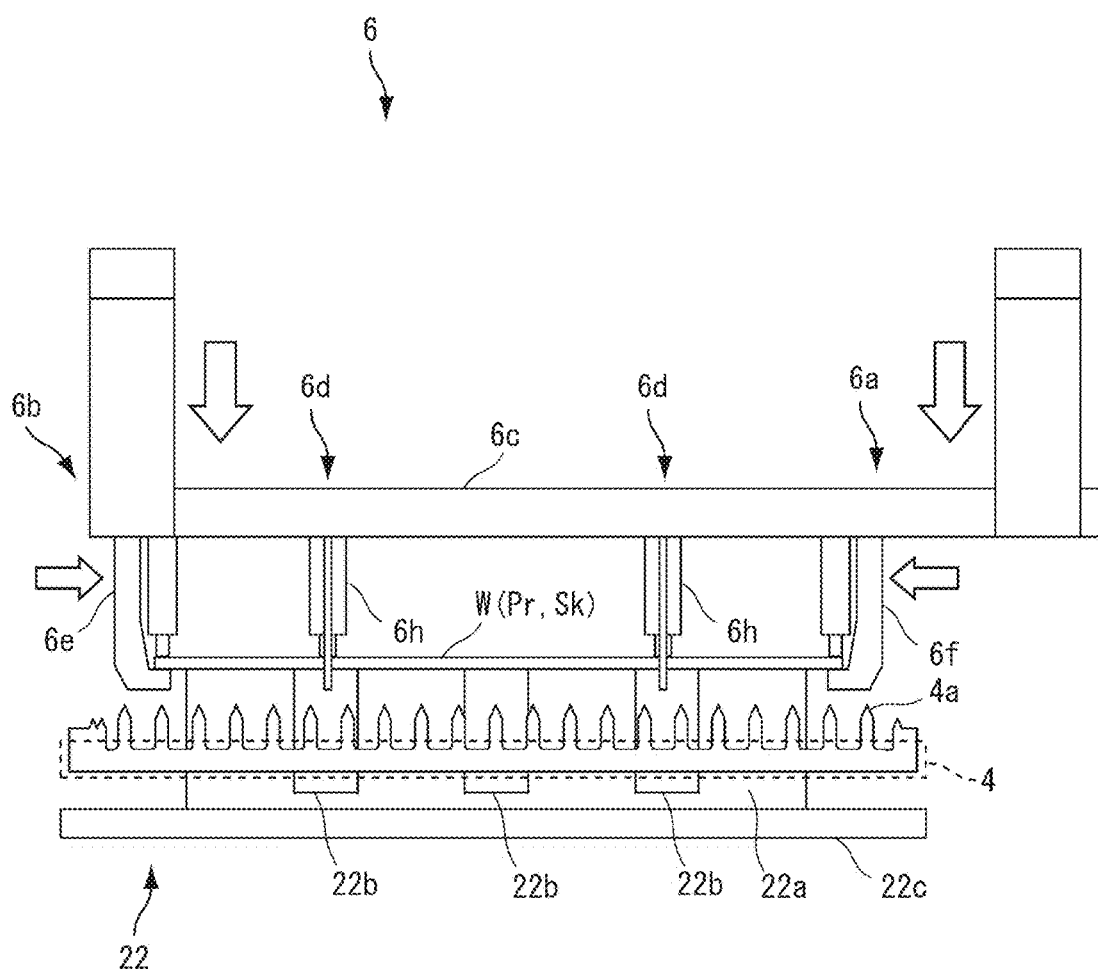
FIG. 8 is a diagram showing an example of gripping a skeleton by a gripper device according to a preferred embodiment of the present invention.
Figure 9:
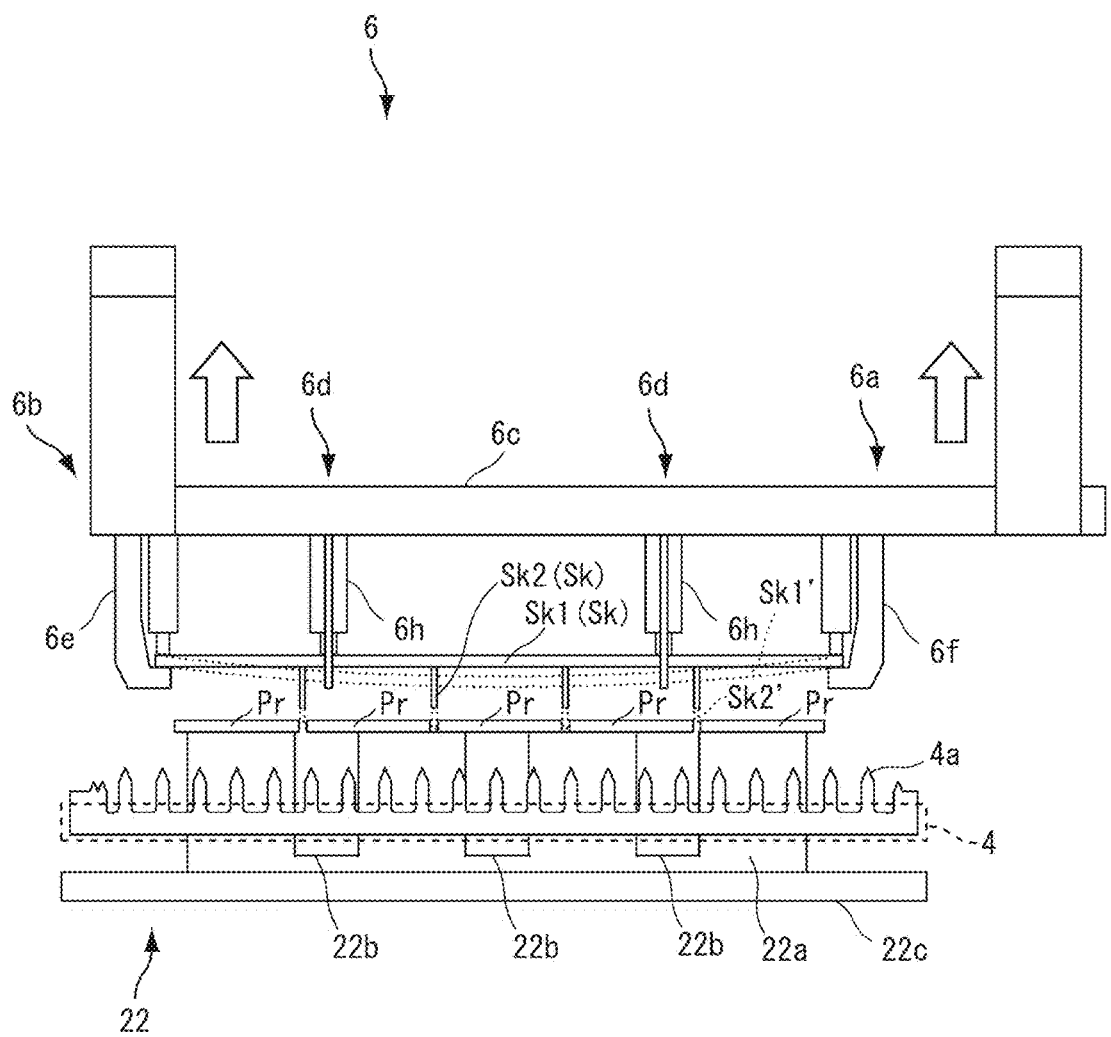
FIG. 9 is a diagram showing an example of gripping a skeleton by a gripper device according to a preferred embodiment of the present invention.
Figure 10:
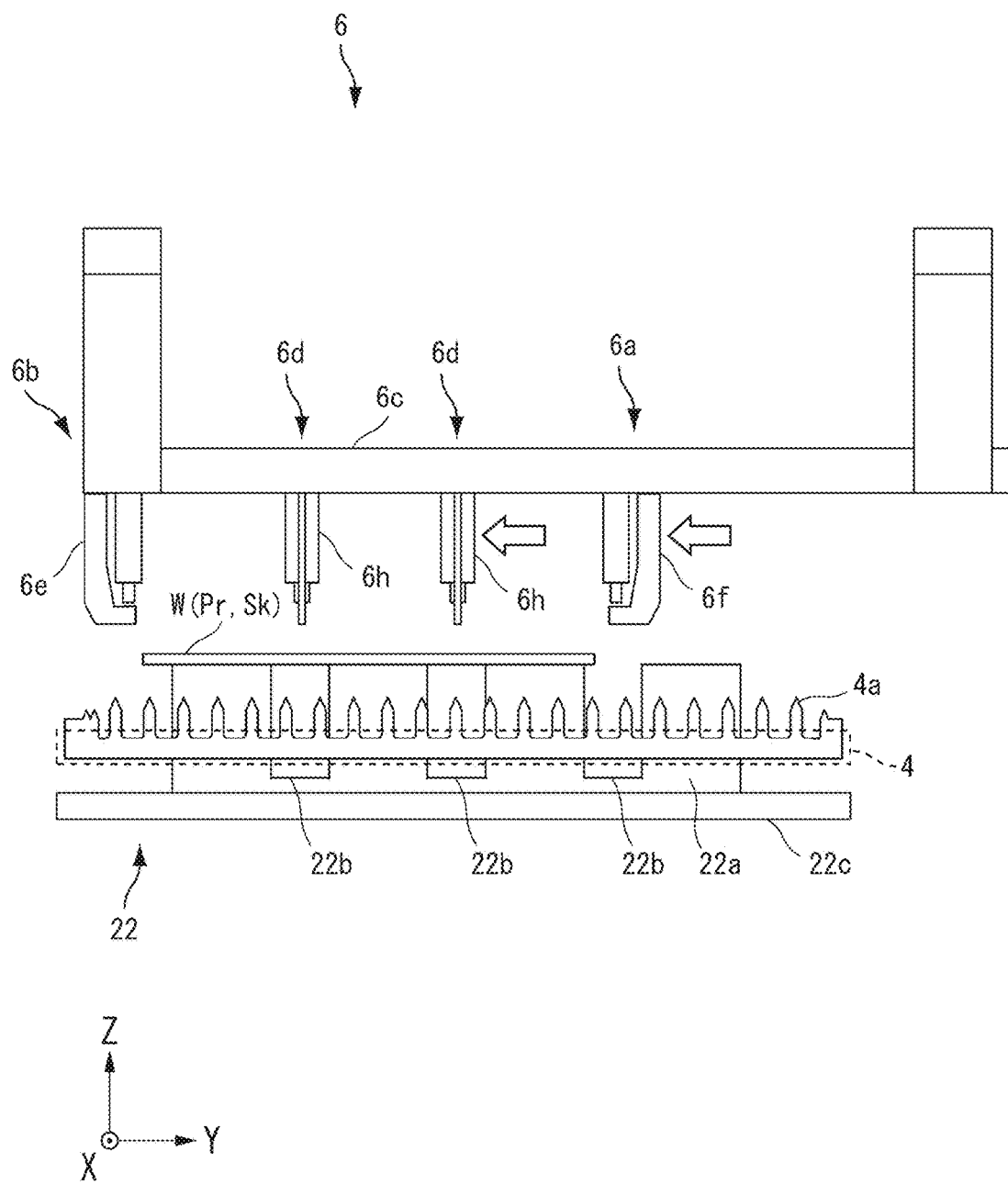
FIG. 10 is a diagram showing an example of gripping a skeleton by a gripper device according to a preferred embodiment of the present invention.
Figure 11:
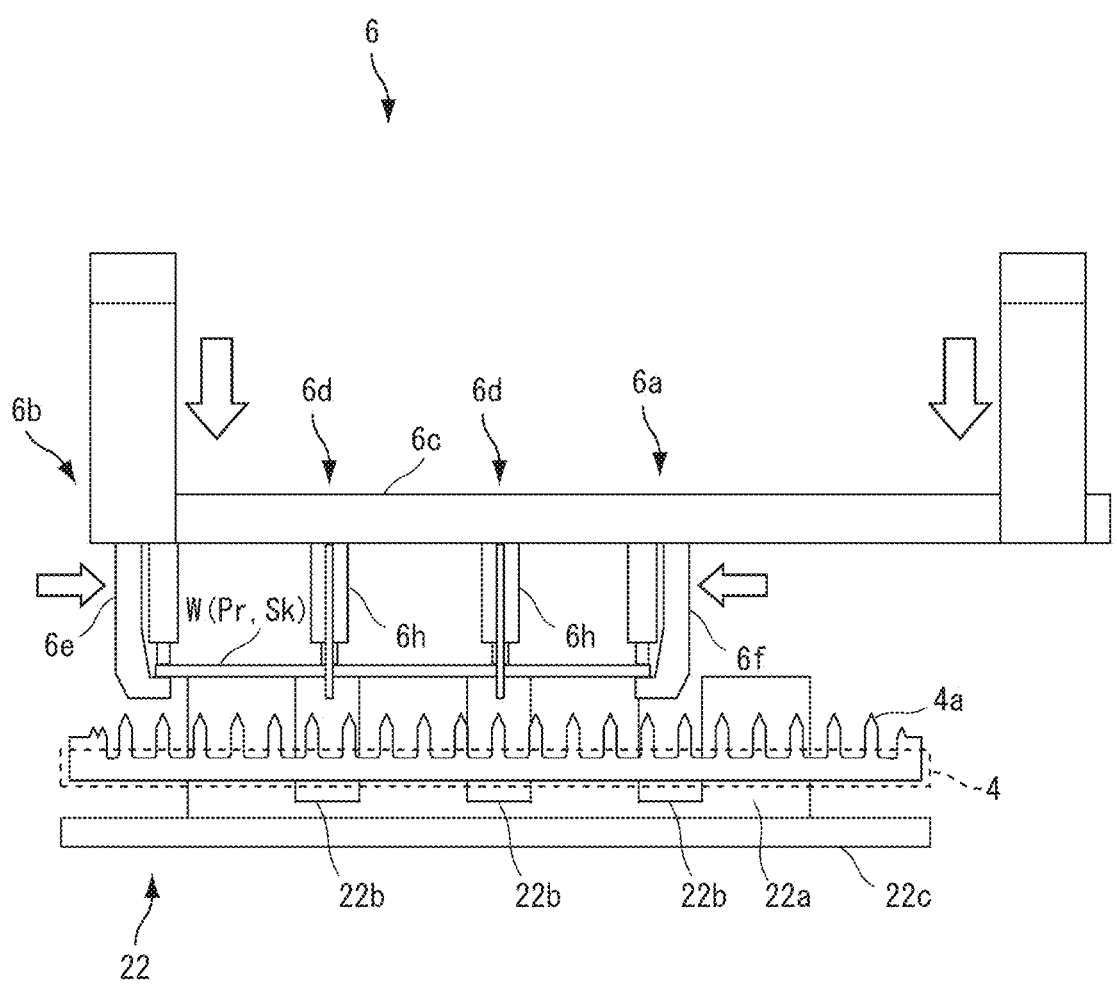
FIG. 11 is a diagram showing an example of gripping a skeleton by a gripper device according to a preferred embodiment of the present invention.
Figure 12:
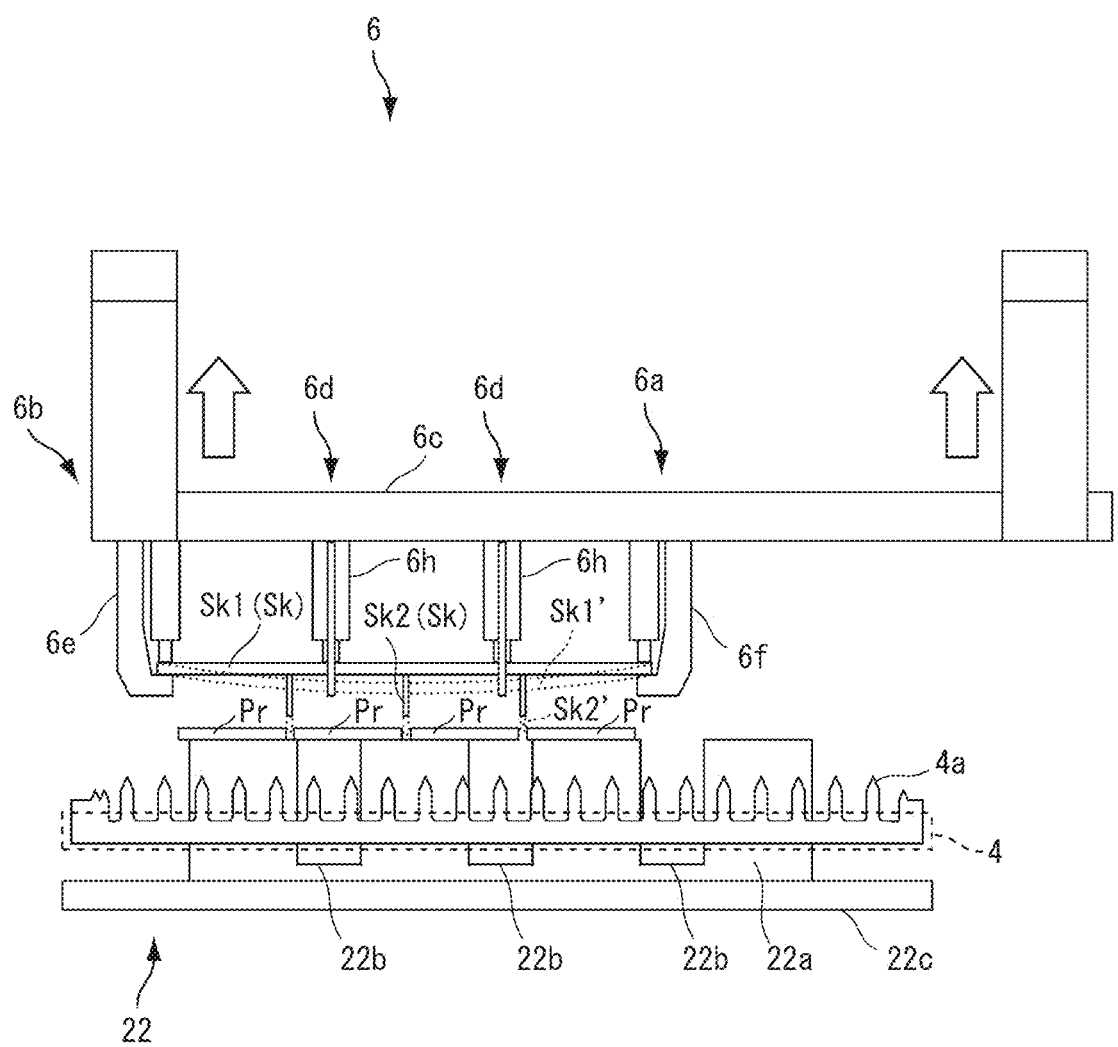
FIG. 12 is a diagram showing an example of gripping a skeleton by a gripper device according to a preferred embodiment of the present invention.

FIG. 7 to FIG. 12 are diagrams showing an example of gripping the skeleton by the gripper device according to the present preferred embodiment. FIG. 7 to FIG. 9 exemplify a case where movement of the short-side grippers 6h in the X direction is required but sliding in the Y direction by the X guides 6d and the slider 6a is not required. FIG. 10 to FIG. 12 exemplify a case where movement of the short-side grippers 6h in the X direction is required and sliding in the Y direction by the X guides 6d and the slider 6a is required. In FIG. 9 and FIG. 12, the state of the skeleton where the short-side grippers 6g, 6h are not used is indicated by dotted lines, the outer frame of the skeleton is represented as "outer frame portion Sk1'", and the crossbars are represented as "crossbars Sk2'". In those cases where the outer frame Sk1' and the crossbars Sk2' are not distinguished, they may simply be referred to as "skeleton Sk'".

As shown in FIG. 7 to FIG. 9, in the gripper device 6, under control of the control device 7 in accordance with the dimensions of the workpiece W, the short-side grippers 6h move along the X guides 6d in the X direction (−X direction). When not positioned above the notches 22b, the short-side grippers 6h are moved to positions above the notches 22b by the movement of the X guides 6d in the Y direction, under control of the control device 7. Then, under control of the control device 7 and the lift device 8, the gripper device 6 descends to a height at which the outer frame Sk1 can be gripped, and the grippers grip the outer frame Sk1. At this time, the long-side grippers 6e, 6f enter between the plurality of lifting plates 22a and grip the long sides of the outer frame Sk1. Similarly, the short-side grippers 6g, 6h enter the notches 22b and grip the short sides of the outer frame Sk1. After the gripper device 6 has gripped the outer frame Sk1 and the gripper device 6 has ascended, the product Pr remains on the plurality of lifting plates 22a. The gripping of the outer frame Sk1 performed by the grippers is executed after the workpiece W has been supported by the supporter 22 (the plurality of lifting plates 22a). As shown in FIG. 9, by gripping the long sides and short sides of the outer frame Sk1 with the long-side grippers 6e, 6f and the short-side grippers 6g, 6h in this manner, sagging of the crossbars Sk2 as well as sagging of the long sides and the short sides of the outer frame Sk1 gripped directly by the grippers are prevented or reduced, so that the crossbars Sk2 do not get caught on the product Pr when removing the skeleton Sk. On the other hand, when the short-side grippers 6g, 6h are not used, the short sides of the outer frame Sk1' are not gripped, and as a result, sagging of the center portion may become significant as indicated with the dotted lines in FIG. 9, and the crossbars Sk2' may get caught on the product Pr in some cases when removing the skeleton Sk'.

As shown in FIG. 10 to FIG. 12, in the gripper device 6, under control of the control device 7 in accordance with the dimensions of the workpiece W, the short-side grippers 6h move along the X guides 6d in the X direction (−X direction). The short-side grippers 6g, 6h on the +Y side move along the Y guides 6c in the Y direction (−Y direction). At this time, the short-side grippers 6g, 6h on the +Y side move to positions above the notches 22b. Moreover, the long-side grippers 6f are moved in the Y direction (−Y direction) by sliding with the slider 6a under control of the control device 7 in accordance with the dimensions of the workpiece W. Then, under control of the control device 7 and the lift device 8, the gripper device 6 descends to a height at which the outer frame Sk1 can be gripped, and the grippers grip the outer frame Sk1. At this time, the long-side grippers 6e, 6f move in the short-side direction between the plurality of lifting plates 22a, and grip the long sides of the outer frame Sk1. Similarly, the short-side grippers 6g, 6h move in the long-side direction through the notches 22b and grip the short sides of the outer frame Sk1. After the gripper device 6 has gripped the outer frame Sk1 and the gripper device 6 has ascended, the product Pr remains on the plurality of lifting plates 22a. The gripping of the outer frame Sk1 performed by the grippers is executed after the workpiece W has been supported by the supporter 22 (the plurality of lifting plates 22a). As shown in FIG. 12, by gripping the long sides and short sides of the outer frame Sk1 with the long-side grippers 6e, 6f and the short-side grippers 6g, 6h in this manner, sagging of the crossbars Sk2 as well as sagging of the long sides and the short sides of the outer frame Sk1 gripped directly by the grippers are prevented, so that the crossbars Sk2 do not get caught on the product Pr when removing the skeleton Sk. On the other hand, when the short-side grippers 6g, 6h are not used, the short sides of the outer frame Sk1' are not gripped, and as a result, sagging of the center portion may become significant as indicated with the dotted lines in FIG. 12 and the crossbars Sk2' may get caught on the product Pr in some cases when removing the skeleton Sk'. The upper end portions of the supporting plates 4a provided with the plate supporters 4b may be formed lower (shorter) than the other portions so as not to interfere with the short-side grippers 6g, 6h when they pass through the notches 22b.

Figure 13:
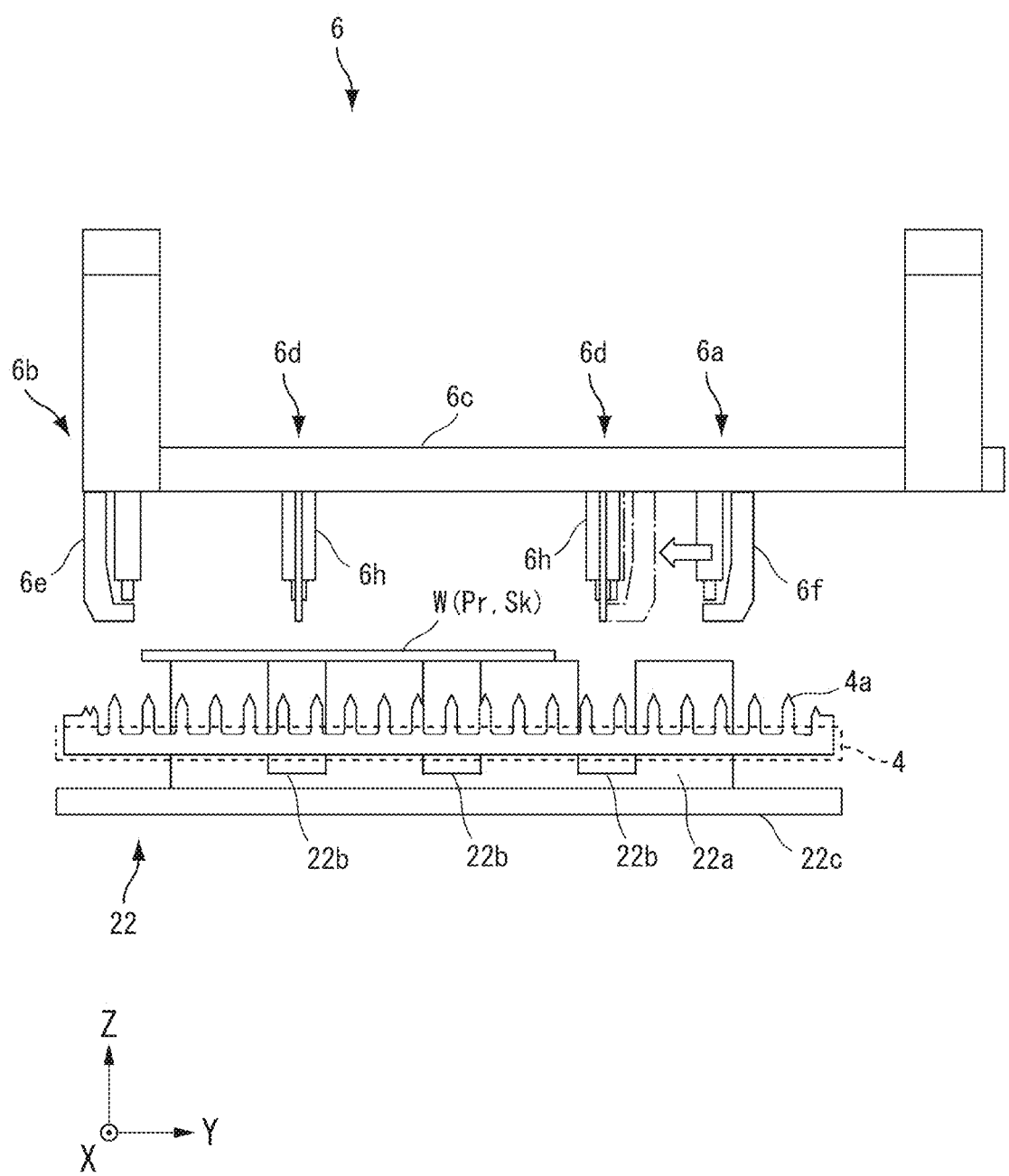
FIG. 13 is a diagram showing an example of interlocking of a gripper device according to a preferred embodiment of the present invention.
Figure 14:
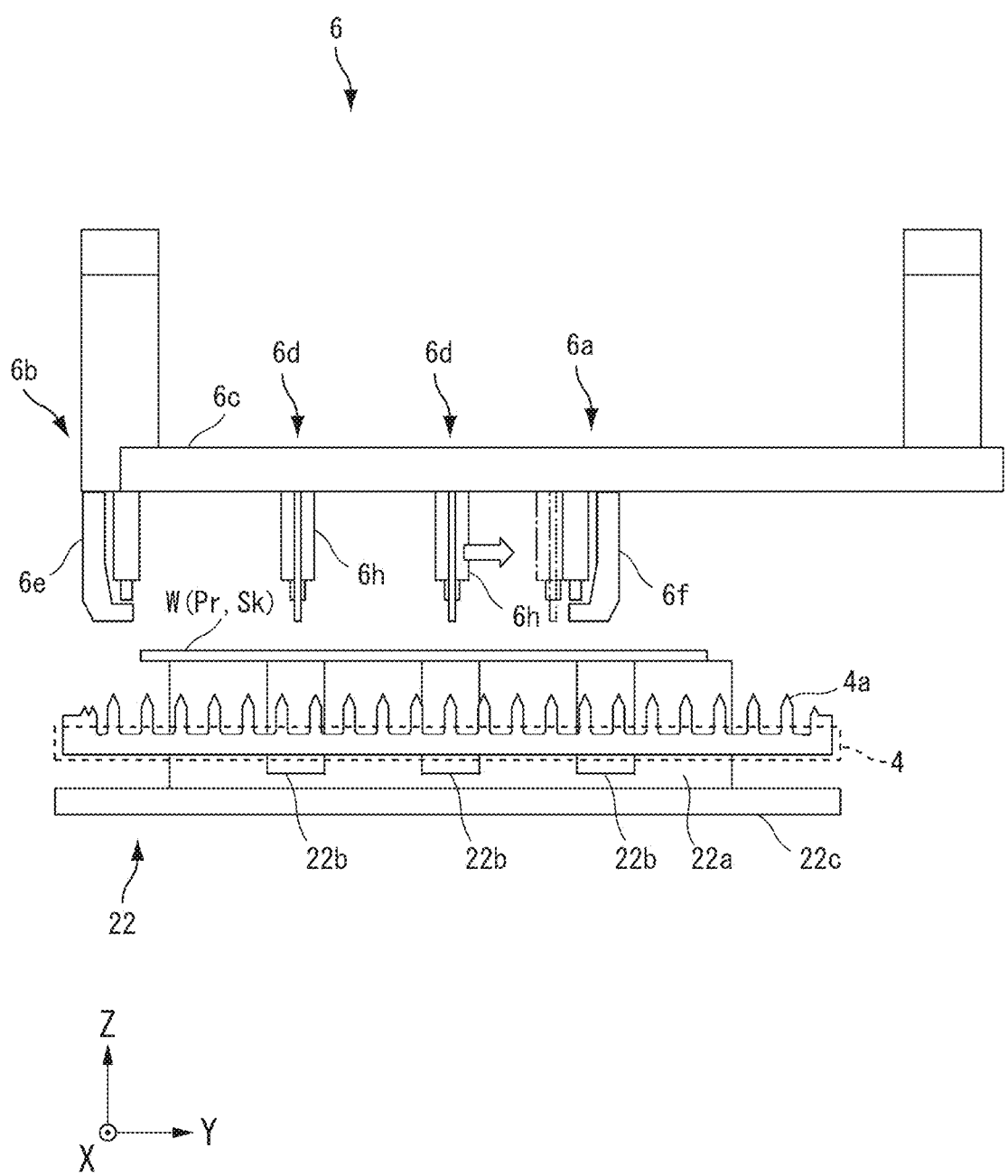
FIG. 14 is a diagram showing an example of interlocking of a gripper device according to a preferred embodiment of the present invention.

FIG. 13 and FIG. 14 are diagrams showing an example of interlocking of the gripper device according to the present preferred embodiment. When moving the short-side grippers 6g, 6h and the long-side grippers 6f in accordance with the dimensions of the workpiece W, the control device 7 controls the operations of the gripper device 6 so that the short-side grippers 6g, 6h and the long-side grippers 6f do not interfere with each other. For example, as shown in FIG. 13, when moving the short-side grippers 6h on the +Y side and the long-side grippers 6f in the −Y direction in accordance with the dimensions of the workpiece W, if the control device 7 causes the long-side grippers 6f to move in the −Y direction before the short-side grippers 6h, there is a possibility of interference, depending on the dimensions of the workpiece W. For this reason, the control device 7 controls operations of the gripper device 6 so as to, after having moved at least one of the plurality of short-side grippers 6h in the short-side direction (−Y direction), move the plurality of long-side grippers 6f in the short-side direction (−Y direction). That is to say, the control device 7 moves the short-side grippers 6h in the −Y direction before the long-side grippers 6f. As shown in FIG. 14, when moving the short-side grippers 6h on the +Y side and the long-side grippers 6f in the +Y direction, if the control device 7 causes the short-side grippers 6h to move in the +Y direction before the long-side grippers 6f, there is a possibility of interference. For this reason, the control device 7 controls operations of the gripper device 6 so as to, after having moved the plurality of long-side grippers 6f in the short-side direction (+Y direction), move at least one of the plurality of short-side grippers 6h in the short-side direction (+Y direction). That is to say, the control device 7 moves the long-side grippers 6f in the +Y direction before the short-side grippers 6h.

As described above, the transport system 1 includes the gripper device 6 that grips both the short sides and the long sides of the outer frame Sk1 of the skeleton Sk, and it is therefore possible to prevent or reduce sagging of the crossbars Sk2 extending in the long-side direction of the skeleton Sk, and favorably separate the skeleton Sk from the product Pr. The transport system 1 causes the grippers in the short-side direction and the long-side direction to move in accordance with the dimensions of the workpiece W to grip the outer frame Sk1, and it is therefore possible to favorably separate the skeleton Sk from the product Pr to suit workpieces W of various dimensions. The transport system 1 controls the operations of the gripper device 6 so that the grippers do not interfere with each other, and it is possible to prevent system stoppage and reduce the time and effort required for inspection work associated with system stoppage. In the supporter 22 that supports the lower surface of the workpiece W, since the transport system 1 includes the plurality of lifting plates 22a, between which the long-side grippers 6e, 6f enter so as to be able to grip the long sides of the outer frame Sk1, and the notches 22b through which the short-side grippers 6g, 6h pass so as to be able to grip the short sides of the outer frame Sk1, it is possible to avoid contact between the grippers and the plurality of lifting plates 22a. The transport system 1 uses the supporter 22 including the notches 22b arranged in alignment with the positions of the plate supporters 4b that support the supporting plates 4a, and it is therefore possible to favorably separate the skeleton Sk from the product Pr without requiring significant changes to be made to the existing system.

The preferred embodiments of the present invention have been described above. However, the technical scope of the present invention is not limited to the description of the above preferred embodiments. It is apparent to those skilled in the art that various modifications or improvements can be added to the above preferred embodiments. The technical scope of the present invention also encompasses one or more of such modifications or improvements. One or more of the requirements described in the above preferred embodiments may be omitted in some cases. Furthermore, one or more of the requirements described in the above preferred embodiments may be combined where appropriate. The order of executing processes shown in the preferred embodiments can be realized in an arbitrary order unless an output of the previous processing is used in the following processing. While operations in the above preferred embodiments have been described with expressions such as "first", "next", and "subsequently" for the sake of convenience, the operations need not always be implemented in that order. The contents of all documents cited in the detailed description of the present invention are incorporated herein by reference to the extent permitted by law.

In the preferred embodiments described above, there has been exemplified a case where the lifting plates 22a and the notches 22b of the supporter 22 are arranged in accordance with the positions of the plate supporters 4b that support the supporting plates 4a, however, the invention is not limited to this example. For example, the arrangement of the lifting plates 22a and the notches 22b may be changed, depending on the number of the plate supporters 4b, or if the plate supporters 4b are not used at all. Moreover, in the above preferred embodiments, the gripper device 6 including the long-side grippers 6e, 6f and the short-side grippers 6g, 6h has been taken as an example, however, the workpiece W is not limited to being rectangular or substantially rectangular but may be square or substantially square, for example. That is to say, the gripper device 6 may include the short-side grippers 6g, 6h that grip the short sides of the outer frame Sk1 of the skeleton Sk, and the long-side grippers 6e, 6f that grip the long sides of the outer frame Sk1 of the skeleton Sk having a length equal to or longer than the short sides (or the same length as that of the short sides).

Noted that the technical scope of the present invention is not limited to the mode described in the above preferred embodiments. One or more of the requirements described in the above preferred embodiments may be omitted in some cases. One or more of the requirements described in the above preferred embodiments may be combined where appropriate. The contents of Japanese Patent Application No. 2020-200419 and all documents cited in the detailed description of the present invention are incorporated herein by reference to the extent permitted by law.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A transport system comprising:
   a gripper;
   a lifter; and
   a controller; wherein
   the gripper includes:
   a plurality of long-side grippers aligned in a long-side direction of a workpiece which is cut, by machining/cutting, into a product and a skeleton including an outer frame with an overall rectangular or substantially rectangular shape and includes a crossbar located inside the outer frame, so that both ends thereof are connected to two shorter sides facing each other, and extending in the long-side direction, the long-side grippers being operable to grip longer sides of the outer frame of the skeleton; and
   a plurality of short-side grippers aligned in a short-side direction with respect to the workpiece to grip shorter sides of the outer frame;
   at least one of the plurality of short-side grippers is movable in the short-side direction according to a short-side direction dimension of the workpiece to grip the shorter sides of the outer frame;
   a lifter is provided to lift or lower the gripper gripping the outer frame and the product, to separate the outer frame and the crossbar from the product; and
   the controller is configured or programmed to control operations of the gripper and the lifter.

2. The transport system according to claim 1, wherein
   the plurality of long-side grippers are movable in the short-side direction according to the short-side direction dimension of the workpiece to grip the longer sides of the outer frame; and
   the plurality of short-side grippers are movable in the long-side direction according to the long-side direction dimension of the workpiece to grip the shorter sides of the outer frame.

3. The transport system according to claim 1, wherein the controller is configured or programmed to control operations of the gripper so as to, after having moved at least one of the plurality of short-side grippers in the short-side direction, move the plurality of long-side grippers in the short-side direction.

4. The transport system according to claim 1, further comprising a processing pallet and a supporter to ascend or descend relative to the processing pallet; wherein
   the processing pallet includes:
   a pallet frame;
   a plurality of supporting plates positioned at predetermined intervals in the long-side direction of the workpiece inside the pallet frame, extending in the short-side direction, and supporting the workpiece at upper ends thereof; and
   a plate supporter extending in the long-side direction inside the pallet frame to support the plurality of supporting plates;
   the supporter includes:
   a plurality of lifting plates positioned at the predetermined intervals in the long-side direction of the workpiece, extending in the short-side direction to ascend or descend between the plurality of supporting plates; and
   a notch provided in each of the plurality of lifting plates and into which the plate supporter enters when the plurality of lifting plates ascend relative to the processing pallet;
   the supporter is operable to ascend relative to the processing pallet to deliver the workpiece supported at the upper ends of the plurality of supporting plates to the plurality of lifting plates; and
   after the plurality of lifting plates have supported the workpiece, the plurality of long-side grippers are movable between the plurality of lifting plates in the short-side direction to grip the longer sides of the outer frame, and the plurality of short-side grippers each move in the long-side direction through the notch to grip the shorter sides of the outer frame.

* * * * *